Dec. 14, 1948.　　　　E. F. ANDREWS　　　　2,456,359
ADJUSTABLE TRUCK HITCH
Filed June 10, 1947
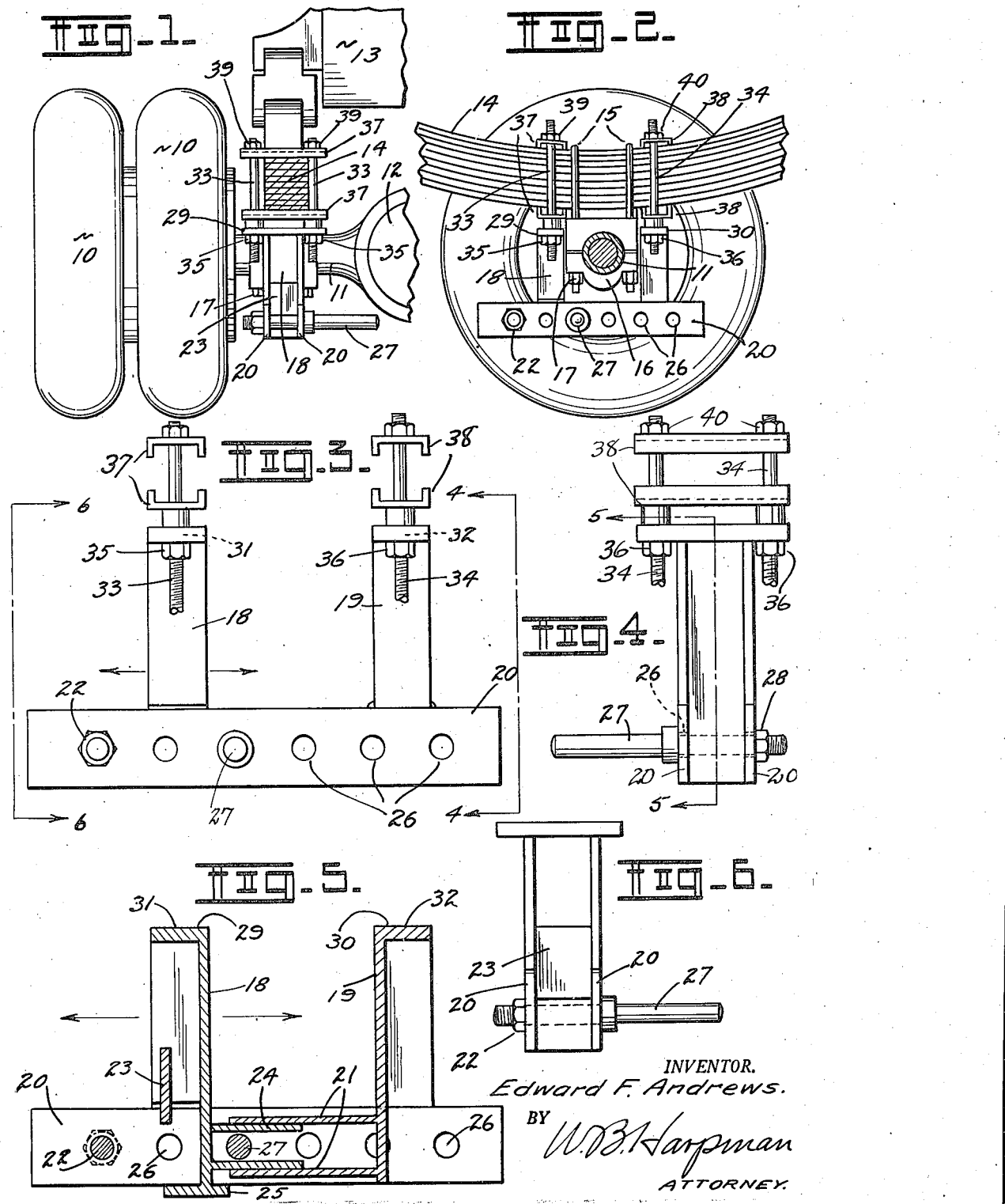
INVENTOR.
Edward F. Andrews.
BY
ATTORNEY.

Patented Dec. 14, 1948

2,456,359

UNITED STATES PATENT OFFICE 2,456,359

ADJUSTABLE TRUCK HITCH

Edward F. Andrews, Youngstown, Ohio, assignor, by mesne assignments, to The Miller Spreader Corporation, Youngstown, Ohio, a corporation of Ohio Application June 10, 1947, Serial No. 753,614

3 Claims. (Cl. 280—150)

This invention relates to a hitch and more particularly to an adjustable type hitch applicable to axle and spring constructions of trucks so that various devices may be attached thereto.

The principal object of the invention is the provision of an adjustable hitch for a truck which may be bolted to conventional truck axle and spring constructions to provide convenient means of attachment for devices such as spreader boxes.

A further object of the invention is the provision of an adjustable hitch applicable to truck spring and axle constructions and capable of being adapted for use with any and all types of truck axles and springs to compensate for the differences in size and relative positioning of the spring clips, etc., found in connection therewith.

A still further object of the invention is the provision of an adjustable hitch for application to truck rear axle constructions providing several alternate locations for a hitching member to which various devices may be attached.

The adjustable hitch shown and described herein, when applied in pairs to a rear axle and spring assemblies, makes possible the convenient and satisfactory hitching thereto of various devices to be towed by the truck such as, for example, a spreader box by means of which various road building materials and the like may be handled directly from the truck to the surface on which they are spread. It is known in the art that various forms of hitch constructions have been proposed for use with trucks and in connection with the application thereto of various attachments such as spreader boxes and the majority of these devices have in the past related to devices which are welded or otherwise directly affixed to the truck construction which is objectionable to many truck operators.

The present invention relates to a device which can be adjusted as to width and height so as to be capable of installation on any type of truck rear axle and spring assembly by bolting the same thereto to provide a practical and relatively inexpensive hitch construction.

With the foregoing and other objects in view which will apear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein—

Figure 1 is a rear view of a portion of a truck rear axle frame and spring construction and illustrates the positioning of the adjustable hitch thereon.

Figure 2 is a cross section of a portion of a truck rear axle and spring construction showing the positioning of the adjustable hitch thereon.

Figure 3 is a side view of the adjustable truck hitch.

Figure 4 is an end view of the adjustable truck hitch taken on line 4—4 of Figure 3.

Figure 5 is a vertical section of the adjustable truck hitch taken on line 5—5 of Figure 4.

Figure 6 is an end view of the adjustable truck hitch taken on line 6—6 of Figure 3.

By referring to the drawings and Figures 1 and 2 in particular it will be seen that a portion of a truck has been shown as comprising one of the dual rear wheel assemblies 10, the rear axle 11 and including the differential 12. The truck frame, indicated by the numeral 13, and the semi-elliptical spring spacing the frame 13 and the axle 11 is indicated by the numeral 14. The axle 11 is affixed to the spring 14 by means of inverted U-shaped bolts 15 which are passed over the spring 14 and the lowermost ends of which are passed through openings in saddle caps 16 and held thereagainst by means of nuts 17.

In order that means may be provided beneath the axle 11 to which devices such as spreader boxes and the like may be attached, an adjustable hitch is affixed to each of the spring and axle assemblies 14 and 11, respectively, one on each side of the differential 12 of the rear axle 11 so that oppositely disposed hitching means may be provided. Each of the adjustable hitch devices comprises an identically formed structure capable of being bolted directly to the spring 14 of the truck while encircling the axle 11 as well as the U-shaped bolts 15 and the saddle caps 16 which make up the axle and spring assemblies.

It will be obvious to those skilled in the art that in various trucks the sizes of the axles and spring assemblies vary both as to width and height and, in order to apply hitch devices thereto in the manner disclosed herein, the devices must be capable of horizontal and vertical adjustment.

By referring to Figures 3, 4, and 5 of the drawings it will be seen that the adjustable hitch comprises a spaced pair of vertically positioned body members 18 and 19, respectively, affixed at their lowermost ends by a pair of spaced, horizontal rails 20 spaced with respect to one another by means of a pair of webs 21. The vertical body member 19 is welded directly to the pair of spaced rails 20 and the vertical body member 18 is slidably affixed thereto as best shown in Figures 5 and 6 of the drawings. This permits the vertical body member 18 to be moved longitudinally with respect to the spaced rails 20 so as to vary the spacings between the vertical body member 18 and the vertical body member 19. The spacing, as may be seen by referring to Figure 2, provides for the necessary clearance of the device about the axle 11 and saddle cap 16 when the same is positioned on a truck.

It will be obvious that when the device is applied to a relatively small truck, the horizontal distance between the body members 18 and 19 will be less than the distance when the device is applied to a rear axle of a relatively large truck.

When the body member 18 is positioned in desired location with respect to the vertical body member 19 it is clamped thereto by means of a bolt and nut assembly 22 positioned through the outermost ends of the spaced rails 20 at a point thereon furthest removed from the fixed spacing provided by the depending portion of the vertical body member 19, which depending portion lies between the spaced rails 20 as shown in Figure 5. The vertical body member 19 is provided with a guide 23 positioned between the outturned flange thereof, as best shown in Figures 5 and 6, the lower depending portion of the guide registering between the spaced rails 20.

The vertical body member 18 is also provided with a pair of outwardly extending, secondary web members 24 which slidably engage the web members 21 heretofore referred to and thereby hold the vertical body member 18 in right angle relation to the web members 21 which are welded or otherwise affixed between the spaced rails 20. A cap 25 is formed to the bottom of the vertical body member 18, the sides of which extend outwardly beneath the pair of spaced rails 20 and which cap helps maintain the vertical body member 18 in proper adjustable relation to the spaced rails 20.

A plurality of openings 26 are formed in oppositely disposed pairs in the spaced rails 20 so that an adjustable hitch pin 27 may be positioned therein, as shown in Figures 1, 2 and 6 of the drawings. It will be obvious that the hitch pin 27 may be varied forwardly or backwardly with respect to its positioning beneath the axle 11 of the truck to which the adjustable hitch is applied by varying its position in the spaced pairs of openings 26 in the spaced rails 20. It is normally secured in relation thereto by means of a nut 28 threadably engaging a smaller threaded portion thereof which is positioned through the openings 26.

By referring again to Figures 1 and 2 of the drawings it will be seen that the vertical body members 18 and 19 are provided with cross members 29 and 30 on their uppermost surfaces. The ends of the cross members 29 and 30 extend sidewardly beyond the sides of the vertical body members 18 and 19 and are provided with pairs of vertical openings 31 and 32, respectively.

In attaching the adjustable hitch to the truck axle and spring assembly, as shown in Figures 1 and 2, two pairs of threaded studs 33 and 34 are positioned through the pairs of openings 31 and 32, respectively, and pairs of nuts 35 and 36 engaged on the pairs of studs 33 and 34, respectively. Oppositely disposed pairs of cross pieces such as channel sections 37 and 38, respectively, are positioned on the studs 33 and 34 above the cross members 29 and 30, respectively, and beneath and above the spring 14, and nuts 39 and 40 are engaged on the studs thereabove. It will thus be seen that the adjustable hitch is directly engaged on the spring 14 by reason of the clamping action of the opposed pairs of channel sections 37 and 38, respectively, as held together between the threaded studs 33 and 34, respectively, which in turn engage the uppermost portions of the vertical body members 18 and 19. In addition, the vertical body members 18 and 19 of the adjustable hitch engage the front and back surfaces of the axle 11 and the saddle cap 16 and spring mounting assembly thereon so as to hold the adjustable hitch firmly and securely in position.

It will be seen that spacing means; for example, a pair of extra spacing washers or the like, are illustrated in Figures 1 and 2 of the drawings in position between the cross members 29 and 30 and the lowermost pair of the channel sections 37 and 38, respectively, spacing means being provided to compensate for the height of the spring 14 at the point on which the adjustable hitch is connected. It will be obvious that when springs 14 of varying heights are encountered, the device may be spaced as illustrated and described herein with respect to the springs to position the parallel horizontal rails 20 in desired relation to the axle 11.

It will thus be seen that the several objects of the invention are met by the provision of an adjustable hitch which may be easily and simply fabricated and quickly and easily applied to a truck axle and spring assembly by the simple expedient of adjusting the hitch to the actual width of the axle and spring assembly and bolting the same in position thereon. The application of the hitch pin 27 may be made in any one of a number of locations along the spaced rails 20 thereby providing for varying the actual attachment point created by the hitch with respect to the truck to which it is applied.

It will be obvious that in most applications pairs of the adjustable hitches are used, one under each of the back springs of the truck, to provide pairs of oppositely disposed, adjustable hitch pins 27 so that devices to be attached thereto (such as spreader boxes) may be directly connected to each of the spring and axle assemblies common in truck constructions.

Having thus described my invention, what I claim is:

1. A hitch for application to a truck rear axle and spring assembly, the said hitch including spaced horizontally positioned rails disposed longitudinally of the said truck and beneath the rear axle thereof, means spacing the said rails with respect to the rear axle, said means comprising a pair of vertical body members one of which is movable longitudinally of the said rails, cross pieces positioned above and below the said spring of the spring and axle assembly and means attaching the said vertical body members to the said cross pieces positioned on the said spring.

2. A hitch for application to a truck rear axle and spring, said hitch including a horizontal member having a plurality of openings formed therein and a hitch pin removably affixed in one of the said openings, a pair of vertical members affixed to the said horizontal member, one of the said vertical members being movably affixed thereto, two pairs of brackets for engaging the said spring and threaded studs engaging the said brackets and the said vertical members and nuts holding the said brackets, studs and vertical members in assembled position about the said axle and on the said spring.

3. A hitch for application to a truck rear axle and spring assembly, the said hitch including spaced horizontally positioned rails disposed longitudinally of the said truck and beneath the said rear axle thereof, a hitch pin secured to said rails and extending transversely thereof and outwardly therefrom, means spacing the said rails with respect to the rear axle, said means comprising a pair of vertical body members one of which is movable longitudinally of the said rails, cross pieces positioned above and below the said spring of the spring and axle assembly and means attaching the said vertical body members to the said cross pieces positioned on the said spring.

EDWARD F. ANDREWS.

REFERENCES CITED

The following references are of record in the file of this patent:

UNITED STATES PATENTS

| Number | Name | Date |
| --- | --- | --- |
| 2,397,001 | Goodwin | Mar. 19, 1946 |
| 2,403,820 | Miller | July 9, 1946 |